United States Patent [19]

Sweeney

[11] Patent Number: 4,830,558
[45] Date of Patent: May 16, 1989

[54] ADHESIVELY SECURABLE FASTENER

[75] Inventor: Theodore J. Sweeney, Grosse Pointe City, Mich.

[73] Assignee: Theodore J. Sweeney & Co., Detroit, Mich.

[21] Appl. No.: 86,363

[22] Filed: Aug. 17, 1987

Related U.S. Application Data

[60] Division of Ser. No. 800,555, Nov. 21, 1985, Pat. No. 4,693,652, which is a continuation of Ser. No. 472,084, Mar. 4, 1983, Pat. No. 4,555,206, which is a division of Ser. No. 234,777, Feb. 11, 1981, Pat. No. 4,425,065, which is a division of Ser. No. 936,331, Aug. 24, 1978, abandoned.

[51] Int. Cl.⁴ .................. F16B 39/00; F16B 37/06
[52] U.S. Cl. ......................... 411/258; 411/82; 411/171; 248/205.3
[58] Field of Search ............... 411/69, 82, 171, 258, 411/23, 965; 405/260, 261; 156/71, 242, 295; 248/205.3

[56] References Cited

U.S. PATENT DOCUMENTS

| Re. 16,062 | 5/1925 | Tomkinson | 411/73 |
|---|---|---|---|
| 2,092,341 | 9/1937 | de Vries | 411/23 |
| 2,268,520 | 12/1941 | Wesley | 411/171 |
| 2,451,194 | 10/1948 | Braun | 248/205.3 |
| 2,557,434 | 6/1951 | Hoverder . | |
| 3,044,340 | 7/1962 | Luhm | 411/60 |
| 3,061,455 | 10/1962 | Anthony | 411/258 |
| 3,108,443 | 10/1963 | Schuermann | 405/261 |
| 3,240,379 | 3/1966 | Bremer et al. | 411/82 |
| 3,311,012 | 3/1967 | Williams | 405/260 |
| 3,469,490 | 9/1969 | Pearce, Jr. | 411/371 |
| 3,472,301 | 10/1969 | Pearce, Jr. | 411/371 |
| 3,489,599 | 1/1970 | Krieble | 411/258 |
| 3,532,316 | 10/1970 | Mathes | 156/242 |
| 3,704,264 | 11/1972 | Gorman | 411/965 |
| 3,719,792 | 3/1973 | Cuccaro . | |
| 3,757,828 | 9/1973 | Frauenglass | 411/258 |
| 3,880,535 | 4/1975 | Durham et al. | 411/116 |
| 3,922,449 | 11/1975 | Bolger | 411/82 |
| 4,076,774 | 2/1978 | Short . | |
| 4,094,222 | 6/1978 | Lang et al. | 411/15 |
| 4,224,971 | 9/1980 | Muller et al. | 411/360 |
| 4,389,035 | 6/1983 | Freeman | 248/205.3 |

FOREIGN PATENT DOCUMENTS

| 198005 | 6/1958 | Austria | 405/261 |
|---|---|---|---|
| 701599 | 1/1965 | Canada | 411/258 |
| 1232538 | 1/1967 | Fed. Rep. of Germany | 405/261 |
| 1500720 | 5/1969 | Fed. Rep. of Germany . | |
| 1950800 | 4/1971 | Fed. Rep. of Germany | 411/69 |
| 2240017 | 2/1974 | Fed. Rep. of Germany | 411/171 |

Primary Examiner—Neill R. Wilson
Attorney, Agent, or Firm—Ralph M. Burton

[57] ABSTRACT

Described is an adhesively securable fastener comprising a body having an opening; an adhesive positioned within said body and registering with the opening of the chamber, a plunger means for applying pressure to said adhesive such as against an anvil means thereby adhesively securing the fastener to a substrate. Also described is a method for securing a substrate using the fastener described herein.

18 Claims, 4 Drawing Sheets

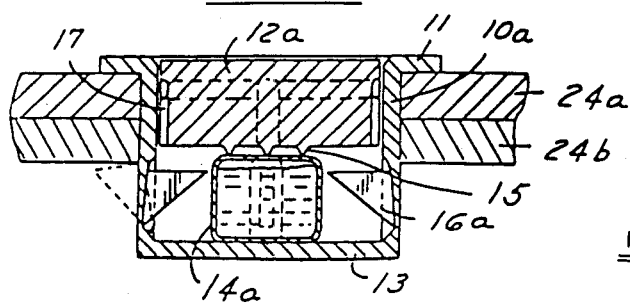
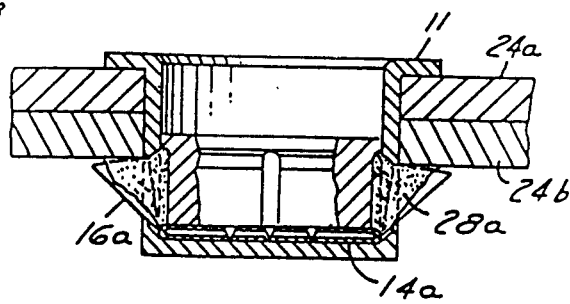
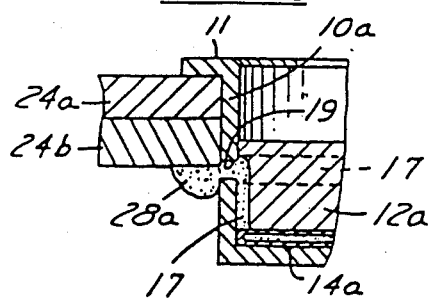
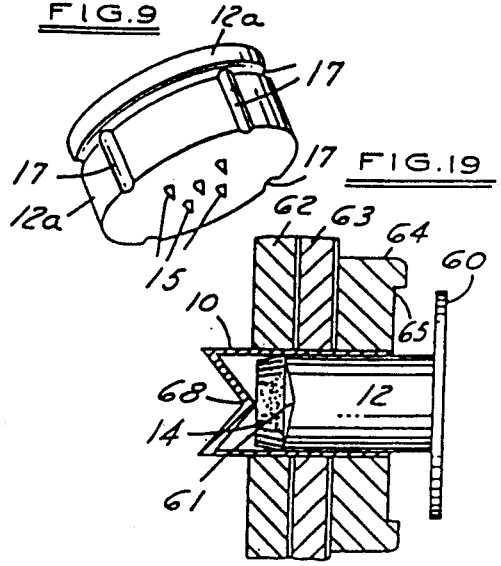
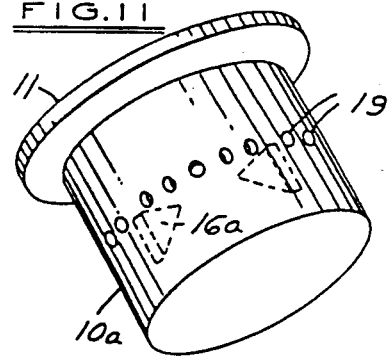
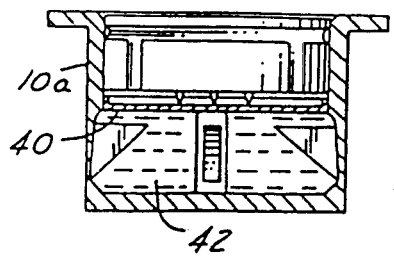
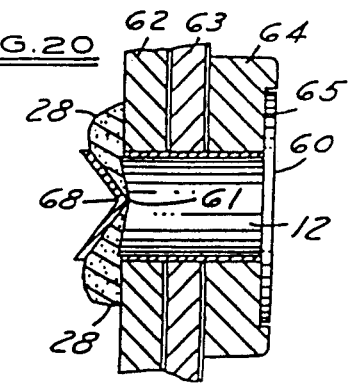

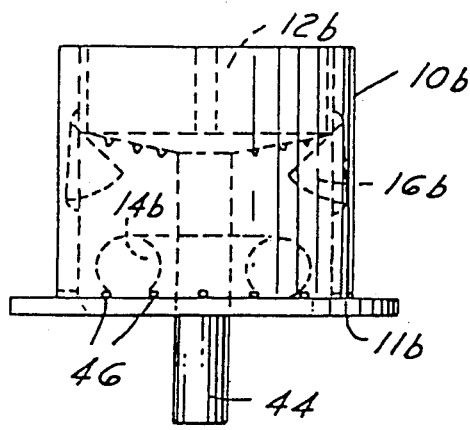
FIG.13
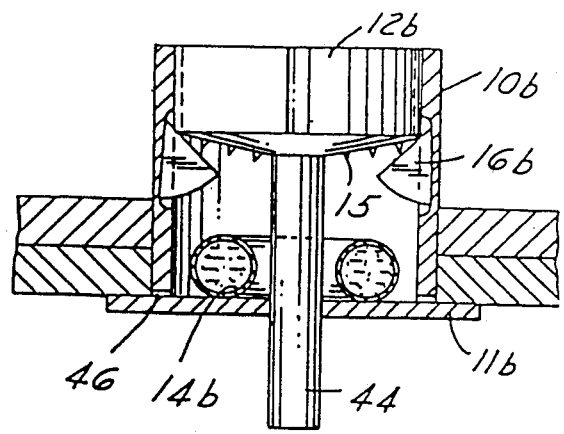
FIG.17
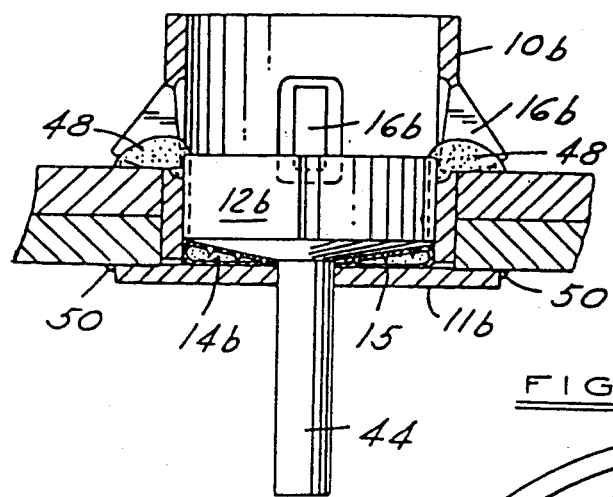
FIG.18
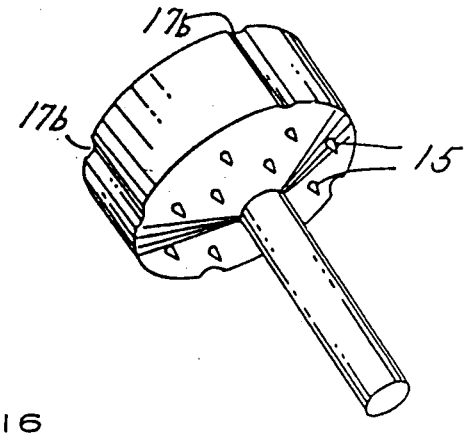
FIG.15
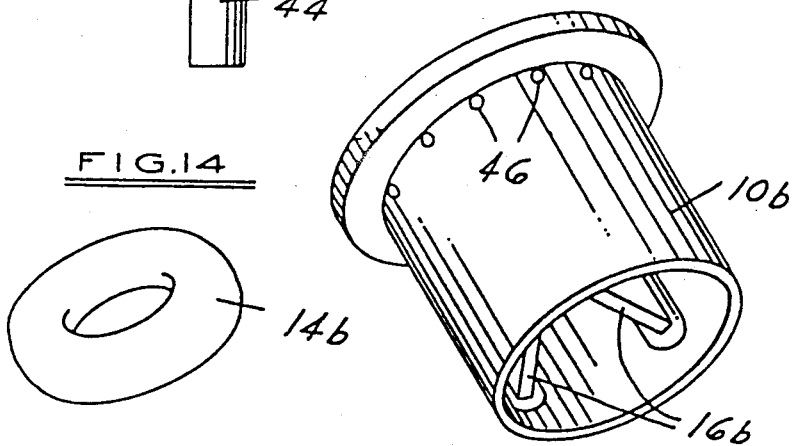
FIG.14
FIG.16

ADHESIVELY SECURABLE FASTENER

CROSS REFERENCE TO RELATED CASES

This case is a division of U.S. application Ser. No. 800,555, filed Nov. 21, 1985, now U.S. Pat. No. 4,693,652 which is a continuation of U.S. application Ser. No. 472,084 filed Mar. 4, 1983, now U.S. Pat. No. 4,555,206, which is a division of U.S. application Ser. No. 234,777 filed Feb. 11, 1981 now U.S. Pat. No. 4,425,065, which s a division of U.S. application Ser. No. 936,331, filed Aug. 24, 1978 now abandoned, all of which are hereby incorporated by reference.

BACKGROUND OF THE INVENTION

The present case is concerned with the fastener art as well as with the art of quicksetting adhesives.

The utilization of quicksetting adhesive has been sharply diminished because of the handling problem associated with said adhesive. Mechanical fasteners have been considered undesirable because of the potential for the fastener to loosen or disengage, thereby losing its effectiveness.

SUMMARY OF THE INVENTION

It is an object of the present invention to provide a fastener which can be safe means for handling quickset adhesives. It is also an object of the present invention to mechanically and adhesively secure a fastener to a substrate. It is also an object of the present invention to describe a lightweight adhesively securable fastener.

All of these object are accomplished by an adhesively securable fastener comprising:

a body having an opening;
an adhesive positioned within said body; and
registering with the opening of the body, a plunger means for applying pressure to said adhesive thereby adhesively securing the fastener to a desired substrate.

preferably the adhesive is a quicksetting adhesive such as an anaerobic adhesive or a cyanoacrylate type.

BRIEF DESCRIPTION OF THE DRAWINGS

FIG. 7 is an alternative embodiment of the fastener of the present invention inserted within a hole of a substrate to which the fastener is to be applied, said fastener showing deflectable tabs;

FIG. 8 shows the fastener of FIG. 7 in an engaged condition;

FIG. 9 shows an alternative embodiment of the plunger means useful in the fastener of the present invention;

FIG. 10 shows the plunger means of FIG. 9 in engagement in the fastener of the present invention;

FIG. 11 shows an alternative embodiment of the body of the fastener of the present invention;

FIG. 12 is an alternative embodiment of the present invention showing a diaphragm holding the adhesive mass in the body of the fastener of the present invention;

FIG. 13 is an alternative embodiment of the fastener of the present invention having a frangible stem on a plunger means;

FIG. 14 shows an alternative means of a holding the adhesive mass useful in the fastener of the present invention;

FIG. 15 is an alternative means for a plunger useful in the fastener of the present invention;

FIG. 16 is an alternative means for the body useful in the fastener of the present invention;

FIG. 17 shows the combination of the fastener, and adhesive and the body of FIGS. 14, 15 and 16 assembled;

FIG. 18 shows the fastener of FIG. 17 in an engaged position;

FIG. 19 is an alternative embodiment of the fastener of the present invention in the unengaged condition;

FIG. 20 shows the fastener of FIG. 19 in an engaged condition.

DESCRIPTION OF PREFERRED EMBODIMENTS

Figure 1:
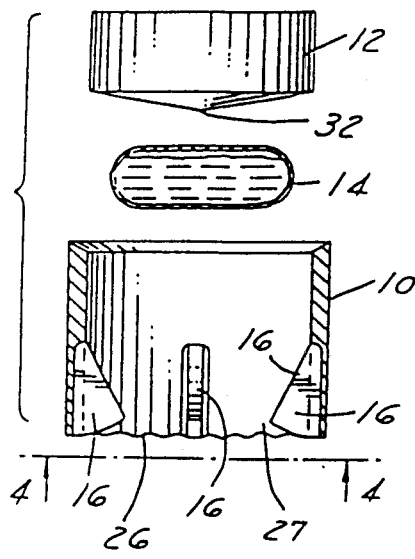
FIG. 1 is a schematic view of the adhesively securable fastener of the present invention in a side sectional view.
Figure 3:
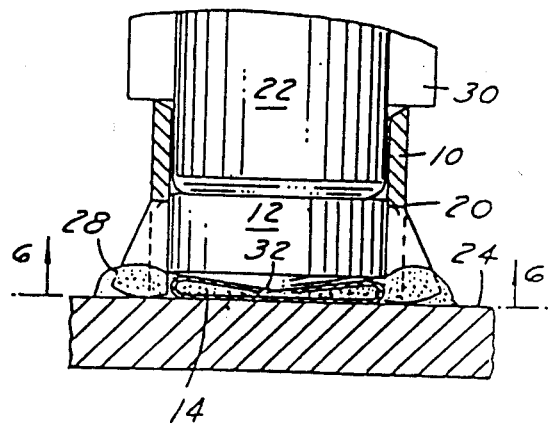
FIG. 3 is an alternative embodiment of the fastener of FIG. 2 in an engaged condition.

The body of the fastener of the present invention may be comprised of any metal or wood or plastic. If a metal were employed, a sheet metal of appropriate design would be used, such as aluminum, iron, such as steel or galvanized iron, zinc, magnesium, titanium and alloys thereof. If a plastic were employed, any of the well known plastics may be employed such as those described in *Modern Plastics Encyclopedia* 1975/1976, published by McGraw Hill, Inc. Suitable plastics may be acrylo nitrilie-butadiene-styrene (ABS), an acrylic material, an epoxy material, a phenolic, a melamine, a nylon, a polycarbonate, such as Lexan (trademark of General Electric Company), olefins, such as polyethylene, polypropylene, ethylene propylene diene monomer (EPDM), polyvinyl chloride, Suryl (trademark of DuPont for an ionomer) and the like. It is to be appreciated that the plastics may be reinforced with fillers, fibers, such as glass fibers and the like.

The adhesive that may be employed in the present application is any quicksetting adhesive well known in the art. Suitable adhesives are cyanoacrylates, anaerobics, hot melt adhesives, pressure sensitive adhesives, and other adhesives that can cure quickly. It is to be appreciated that an adhesive may not be quicksetting at ambient temperature but through the application of heat may set quickly. Such adhesives fall within the meaning of a quicksetting adhesive as used in the present application. Various adhesives may be used such as those described in the *Handbook of Adhesive Bonding* edited by Charles V. Eagle, published by McGraw Hill, Inc., and also *Applied Polymer Science* edited by J. Kenneth Craver and Roy W. Tess, published by the American Chemical Society, 1975, at pages 473 and following, which are hereby incorporated by reference.

A particularly preferred class of adhesive are those that are micro-encapsulated. See "Advances in Micro-Encapsulation Techniques", Flinn, et al, Battelle Technical Review, 1967, as well as *Chemical Engineering,* Dec. 4, 1967, page 77 and following, hereby incorporated by reference. The adhesive that is useful in the present inventions generally an adhesive mass that contains sufficient adhesive to permit securing of the fastener to the substrate. The adhesive mass may be of a tacky or non-tacky nature. One advantage of utilizing the micro-encapsulated adhesives is that a variety of materials may be employed, depending upon the substrate to which the fastener is to be adhered.

A variety of means of encapsulating adhesives are well known in the art. U.S. Pat. No. 3,825,640 indicates that capsules can be manufactured in accordance with the techniques of interfacial polymerization (U.S. Pat. No. 3,432,437) or phase separation (U.S. Pat. No. 3,415,758; U.S. Pat. No. 2,800,457) or solvent exchange (U.S. Pat. No. 3,516,943) or meltable dispersion (U.S. Pat. No. 3,161,602) or mechanical methods of film impingement (U.S. Pat. No. 3,015,128) or spray drying (U.S. Pat. No. 3,016,308). A variety of classes of adhesives may be encapsulated. Some of the more familiar materials are epoxides, urethanes, unsaturated polyesters, alkyds and other resins. Liquid adhesive, such as a polythiol with an encapsulated curing agent, may be prepared thereby having a one part system such as that taught in U.S. Pat. No. 3,748,313. This technique is applicable not just to polythiol adhesives but to virtually any adhesive which requires the use of a curative, for the curative may be encapsulated an the capsule broken during the desired curing thereof. Encapsulated techniques are also taught in *Chemical Engineering,* Dec. 4, 1967, at about page 177, hereby incorporated by reference. The technique of containing an encapsulated curing catalyst for polysulfides is also taught in U.S. Pat. No. 3,505,254.

Another technique would be to apply a coating to the encapsulated adhesives so that they may then be applied as a normal coating composition somewhat similar to a liquid paint, or a viscous paste to the interior chamber of the fastener. U.S. Pat. No. 3,694,243 has a meltable adhesive clinging in a dust-like fashion about encapsulated adhesives, thereby permitting a variety of adhesives to be employed. The wall surrounding the adhesives would be a gelatin or a gum arabic.

One could encapsulate epoxies, polyesters, silicons, polysulfides or polyurethanes by the technique taught in U.S. Pat. No. 3,725,501, wherein multiple adhesives with separate curing agents for each were encapsulated in separate compartments so that there would be one package for the material.

If one wished to have elastomeric adhesive, U.S. Pat. No. 3,813,259 teaches a resin coated encapsulated elastomeric crumbs which contain various rubber materials.

A particularly preferred technique is the utilization of encapsulated anaerobic adhesives. Means for encapsulating said anaerobic adhesives are taught in U.S. Pat. No. 3,814,156; 3,826,673 and 3,826,756, hereby incorporated by reference. A pressure sensitive anaerobic adhesive composition is taught in U.S. Pat. No. 3,996,308, whereby the accelerator therefor is encapsulated.

While the adhesive mass may be any one of the techniques described above, another alternative would be to employ plastic bubbles or a hermetically sealed adhesive as the adhesive within the elongated chamber as described above. In this way the capsule or the plastic bubble containing the adhesive can be ruptured as described below.

It is to be appreciated that by the encapsulation technique or by the technique of retaining the adhesive within plastic bubbles, one could use multi-component adhesives. This is the technique that may frequently be employed with polyurethanes or epoxy material where the cross-linking agent or the curing agent employed is separate from the primary portion of the adhesive system which is the binder. Anaerobic adhesives could also be employed in the present application, especially microencapsulated anaerobic adhesives where the various components of the anaerobic system are present in a number of plastic bubbles or capsules. For example the anaerobic composition which is the polymerizable monomer may be in one plastic bubble with the other plastic bubbles containing the polymerization inhibitor, a polymerization initiator, a polymerization accelerator, and a plasticizer and the like.

The fastener which is contemplated by the present invention may be secured directly to a surface or it may pass through a hole in a substrate, or through registering holes in juxtaposed substrates, for securing the fastener to the substrate through the hole or securing the substrates together. The substrates may be formed of wood, plaster, plastic or metal, such as aluminum, zinc, iron, steel, magnesium, titanium based materials or alloys thereof.

Figure 2:
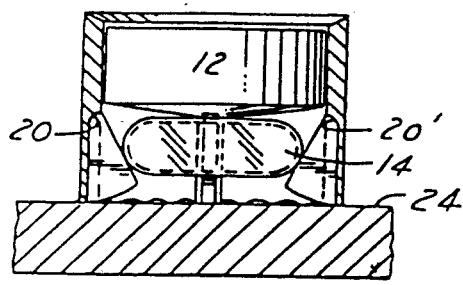
FIG. 2 is the fastener of FIG. 1 in an assembled fashion immediately adjacent a substrate.
Figure 4:
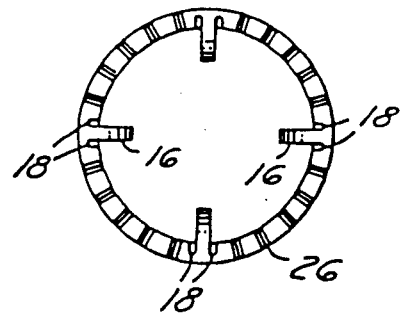
FIG. 4 is a bottom view of the fastener of FIG. 1.
Figure 5:
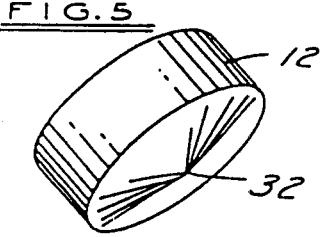
FIG. 5 is a side perspective view of the plunger means useful in the fastener of the present invention.
Figure 6:
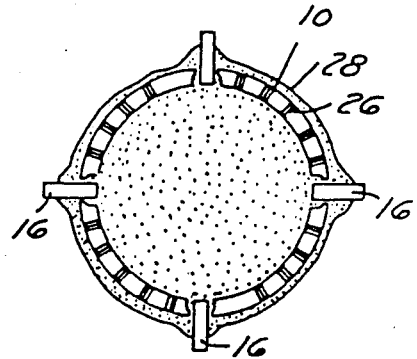
FIG. 6 is a bottom view of the fastener of FIG. 3 taken along the line 6—6.

Turning now to a discussion of the drawings, FIG. 1 is a three-part fastener showing an elongated, body 10, a plunger 12 and an adhesive mass 14. These elements are assembled in FIG. 2 where four deflectable tabs 16 retain the adhesive mass 14 in the body beneath the plunger means 12. The wall of the body is relieved or weakened adjacent each tab as at 18, to allow the tabs to be pushed outwardly, pivoting about the connecting point 20 as the plunger is forced downwardly as by a tool or ram 22 during application of the fasteners to a substrate 24; the lower edge of the body may be provided with serrations 26 to provide spaces at the panel surface 24 through which the adhesive may be forced at 28 to form the joint.

The plunger may have a shoulder 30 abutting the upper end of body 10 to hold the body against the substrate surface 24. The plunger 22 is pushed through the shoulder to abut the plunger 12 and depress the capsule 14 which is punctured by the edge of the tab 16. The plunger 12 may have somewhat pointed end 32 for facilitating puncture of the adhesive mass.

The action of the plunger 12 against the tab 16 or the serrations 26 can be compared to the action of a plunger against an anvil means. By "anvil" is meant any point, flat or curved surface on which the adhesive can be depressed to assist in applying or spreading the adhesive and its components from the body 10 to the substrate 24.

The body 10 may also be constructed for facilitating securement of another part thereto. For example, the exterior of the body spaced from the opening 27 thereof may be threaded to receive a nut or a bolt, or it may be provided with a laterally projecting peripheral shoulder. If desired, the plunger 12 may have a greater length so that upon being fully depressed it fills the cavity within the body.

In FIG. 7 a modification is shown wherein the fastener body 10a extends through registering holes in panels 24a and 24b and the body has a peripheral flange 11 overlying one of the panels. The bottom of the body is closed as at 13 and the adhesive containing capsule 14 is disposed to be punctured by sharp projections 15 on the plunger 12a. As the plunger is depressed the capsule is fractured and adhesive backflows through peripheral grooves 17 in the plunger and radially outwardly through openings 19 in the body to admit adhesive to the joint. The tabs 16a swing out locking the fastener in place with the adhesive sealing the opening and locking the fastener therein as at 28a.

In FIG. 7 a hermetically sealed adhesive chamber 14a is shown as an integral part of the fastener body 10a. A diaphragm 40 of FIG. 12 divides the body cavity above the adhesive 42. The diaphragm is punctured or displaced downwardly as the plunger is depressed and the resulting action is shown in FIG. 8. FIG. 12 shows the fastener ready to be inserted into a hole in a panel similar to that of FIG. 7.

FIGS. 13-18 show a fastener in which the plunger 12b is pulled rather than pushed, the same having a stem 44 which may, if desired, by frangible connected to the plunger so that it will break therefrom after the plunger has been fully drawn into the body.

The body 10b has a flange 11b with holes 46 just above it as shown in FIG. 16 to allow escape of adhesive between the flange and the surface of a panel. The adhesive may be contained in a donut 14b. The tabs 16b swing out as the plunger is drawn into the body and adhesive may backflow, after puncture of the donut by projections in the plunger, through peripheral grooves 17b in the plunger to escape to the top of the panel assembly through the fractures in the body created when the tabs 16b are pressed outwardly such that the adhesive overlies the top of the panel assembly at 48 and beneath the same as at 50.

In FIGS. 19 and 20 there is an alternative to FIG. 7 and 8 wherein the plunger 12 having a lip 60 is retained within the elongated body 10 which is positioned between panels 62 and 63. An integrally molded portion 64 of the fastener has a recessed area 65 in which the plunger lip 60 may be inserted. During the operation of the fastener shown in FIGS. 19 and 20, pressure is applied on the plunger 12 breaking the adhesive mass 14 by means of indented portion 68 of the elongated body. Said adhesive then breaks from its capsule forming a seal 28 and securing the panels. In a preferred embodiment, sheets 62 and 63 may be a lock and sheet metal respectively. The indented portion 68 would be constructed to permit alignment of the tip 61 of the plunger therewith in a fashion to facilitate releasing the adhesive and yet have sufficient adhesive present for seal with the substrates 62 and 63.

Figure 21:
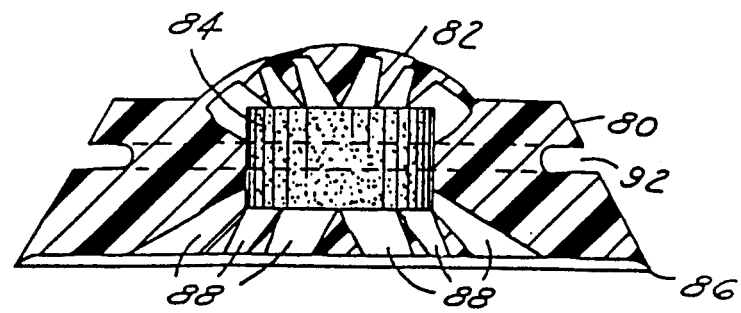
FIG. 21 is an alternative embodiment of the fastener of the present invention having a button type fastener.
Figure 22:
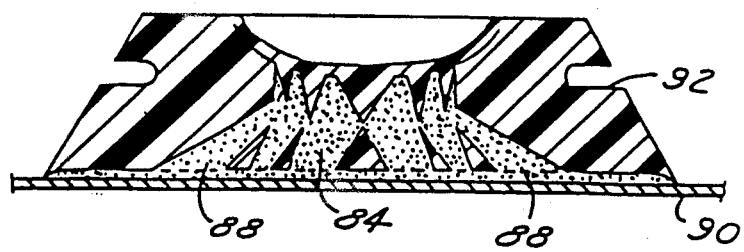
FIG. 22 is the fastener of FIG. 21 adhered to a substrate.

FIG. 21 is an alternative embodiment of the fastener of the present invention, having a body portion 80, a plunger means 82 and a mass of adhesive 84 retained within the body. The opening of the body has a flexible lip 86. The flexible lip circumscribes the adhesive after it is depressed through a series of channels 88 in the body of the fastener. When the plunger 82 is depressed, the body is firmly pressed towards the substrate 90 to which the fastener is to be applied. As the plunger is depressed, the flexible lip bends so as to form an area in which the adhesive can be retained. This aspect is important as it relates to the use of quick-drying adhesives as anaerobic adhesives. The use of a flexible lip permits the anaerobic adhesive to be spread onto the substrate and at the same time to expel all air that is in the area and prevent any air from coming into the area in which that adhesive has been applied, thereby permitting the curing of an anaerobic adhesive.

It has been found particularly advantageous to have a means for releasing anaerobic adhesives after they have been cured as a safety mechanism. The releasing means is in direct contact with the substrate to which the anaerobic adhesive is attached. Basically, the releasing means is a collection of micro-encapsulate organic solvent, which solvent has the capability of dissolving the cured anaerobic adhesive. Utilization of such an encapsulated solvent allows a release of the anaerobic adhesive because the solvent will dissolve the anaerobic composition which is generally acrylate in nature. Formation of the encapsulated adhesive can occur through any of the appropriate techniques known in the art. See *Chemical Engineering*, supra. The application of an encapsulated anaerobic adhesive therefore must be such that the encapsulated releasing means, described above, it not ruptured prior to the curing of the adhesive. This can be accomplished by having the capsules containing releasing agent located in direct contact with anaerobic adhesive and the surface to which it is adhered.

The body 80 may have a groove 92 therein in order to permit attachment of appropriate articles thereto. One example would be the attachment of wires to the groove. An alternative embodiment may be that the fastener may be used as a picture hanger and the wire from a picture could be attached to the groove.

Figure 23:
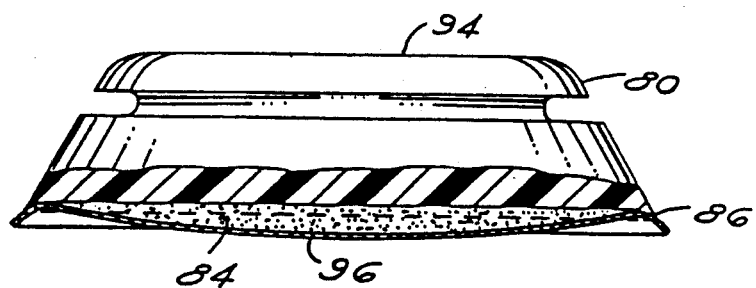
FIG. 23 is an alternative embodiment of the fastener of FIG. 21 with a protective film on the adhesive.
Figure 24:
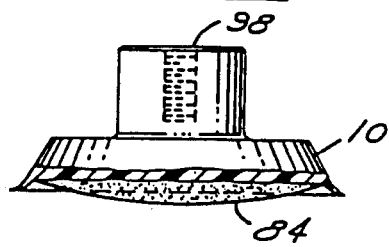
FIG. 24 is an alternative embodiment of the fastener of FIG. 23 adapted to receive a threaded instrument.
Figure 25:
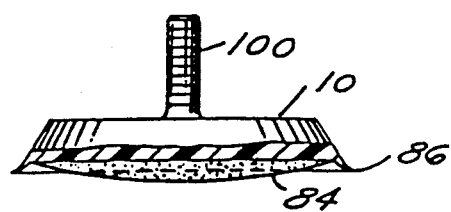
FIG. 25 is an embodiment of the fastener of FIG. 23 adapted to have threads on a portion of the body.

An alternative embodiment to that of FIG. 21 is shown in FIG. 23 wherein the plunger means is basically the top portion 94 of the body of the fastener 80. In the same manner as FIG. 21, the application of pressure to the body at 94 will force the fastener against the substrate causing the lip 86 to bend and allow the spreading of the adhesive thereto. The adhesive is retained as shown in FIGS. 23-25 as taking ups substantially all of the opening of the fastener. In some instances, based upon the type of adhesive that is employed, a paper covering or a resinous film 96 would be over the adhesive mass. FIG. 24 shows a portion of the body 10 threaded on the interior portions at 98 to receive a bolt. FIG. 25 shows a portion of the body 10 threaded at 100 and adapted to screw into a nut or other type of threaded device or instrument.

What is claimed is:

1. a self-contained adhesively securable fastener for securing an article to a substrate wherein there is a body member containing an adhesive reservoir with plunger means for expelling adhesive therefrom and wherein the body member also has a surrounding surface portion adapted to substantially mate with a substrate when the body member is urged there against, the invention characterized by:
    channel means in said surface portion radiating from adjacent said reservoir toward the periphery of the surface portion for distributing adhesive in the reservoir uniformly into the interface between such surface portion and substrate when the body member is urged thereagainst.

2. The fastener of claim 1 there is adhesive in the reservoir and the adhesive is a quicksetting adhesive.

3. The fastener of claim 1 there is adhesive in the reservoir and the adhesive is a micro-encapsulated adhesive.

4. The fastener of claim 1 there is adhesive in the reservoir and the adhesive is an anaerobic adhesive.

5. The fastener of claim 4 wherein the adhesive is a micro-encapsulated anaerobic adhesive.

6. The fastener of claim 1 wherein the plunger means contains a plurality of recessed areas for movement of the adhesive therethrough during the application of pressure to the adhesive by the plunger means.

7. The fastener of claim 1 wherein the body is adapted to permit other instruments to be attached or to be hung therefrom.

8. The fastener of claim 1 wherein the body has a threaded portion for application of a nut or bolt thereto.

9. The invention defined by claim 1 wherein said adhesive reservoir is formed as s separate member from the body member whereby adhesive contained within the reservoir does not contact the body member until expelled from the reservoir.

10. The invention defined by claim 9 wherein said reservoir is hermetically sealed.

11. The invention defined by claim 10 wherein said reservoir is removably receivable in the body member.

12. The invention defined by claim 1 wherein said surface portion terminates in a flexible peripheral lip for preventing entry of air into the interface between the surface portion and a substrate when the body member is urged thereagainst.

13. A method of securing a fastener to a substrate comprising:
   a. holding the fastener of claim 12 to the substrate to be fastened;
   b. applying pressure on the plunger means;
   c. forcing the adhesive from the reservoir and into the interface between said surface portion and the substrate and substantially uniformly distributing it throughout the interface; and
   d. curing the adhesive thereby joining the fastener to the substrate 14. The method of claim 13 wherein the adhesive is a quicksetting adhesive.

15. The method of claim 14 wherein the quicksetting adhesive is an anaerobic adhesive.

16. The method of claim 13 wherein the adhesive is a micro-encapsulated adhesive.

17. The method of claim 13 wherein the adhesive is a micro-encapsulated anaerobic adhesive.

18. The method of claim 13 wherein the adhesive from the body has the ability to extend to the periphery of the lip and throughout the circumference of the lip attached to the substrate.

* * * * *

UNITED STATES PATENT AND TRADEMARK OFFICE
CERTIFICATE OF CORRECTION

PATENT NO. : 4,830,558
DATED : May 16, 1989
INVENTOR(S) : THEODORE J. SWEENEY

It is certified that error appears in the above-identified patent and that said Letters Patent is hereby corrected as shown below:

Column 6, claim 2, line 60, insert the word ---wherein--- before "there".
Column 6, claim 3, line 62, insert the word ---wherein--- before "there".
Column 6, claim 4, line 65, insert the word ---wherein--- before "there".
Column 7, claim 9, line 11, delete the letter "s" and insert the word --a--.

Signed and Sealed this

Third Day of October, 1989

Attest:

DONALD J. QUIGG

Attesting Officer

Commissioner of Patents and Trademarks